US006997221B2

(12) United States Patent
Kurelek et al.

(10) Patent No.: US 6,997,221 B2
(45) Date of Patent: Feb. 14, 2006

(54) REACH ACTUATION FOR ENERGY SAVING HYDRAULIC KNUCKLE BOOMS

(75) Inventors: John Kurelek, Brantford (CA); Grant J. Somerville, Hamilton (CA)

(73) Assignee: Tigercat Industries Inc., Paris (CA)

( * ) Notice: Subject to any disclaimer, the term of this patent is extended or adjusted under 35 U.S.C. 154(b) by 7 days.

(21) Appl. No.: 10/660,708

(22) Filed: Sep. 12, 2003

(65) Prior Publication Data

US 2004/0069375 A1 Apr. 15, 2004

Related U.S. Application Data

(60) Provisional application No. 60/410,831, filed on Sep. 16, 2002.

(51) Int. Cl.
*A01G 23/08* (2006.01)

(52) U.S. Cl. ...................... 144/4.1; 144/34.1; 144/382; 91/533

(58) Field of Classification Search ................. 144/4.1, 144/34.1, 335–339; 52/116; 37/302, 348; 414/680, 694, 685–688; 41/533
See application file for complete search history.

(56) References Cited

U.S. PATENT DOCUMENTS

| | | | | |
|---|---|---|---|---|
| 3,583,585 A | * | 6/1971 | Joyce | 414/694 |
| 3,960,284 A | * | 6/1976 | Carpenter | 414/694 |
| 5,293,914 A | * | 3/1994 | Hudson | 144/24.13 |
| 5,699,247 A | * | 12/1997 | Moriya et al. | 701/50 |
| 5,979,518 A | * | 11/1999 | Hamby | 144/34.1 |
| 6,443,196 B1 | * | 9/2002 | Kurelek | 144/4.1 |
| 6,763,863 B1 | * | 7/2004 | Liu | 144/4.1 |

* cited by examiner

*Primary Examiner*—Derris H. Banks
*Assistant Examiner*—Shelley Self
(74) *Attorney, Agent, or Firm*—R. Craig Armstrong; Borden Ladner Gervais LLP

(57) ABSTRACT

The knuckle boom includes a hoist boom having a proximal end pivoted to a machine base, and a stick boom having a proximal end pivoted to a distal end of the hoist boom. At least one hydraulic hoist cylinder is mounted between the machine base and the hoist boom, and at least one hydraulic stick cylinder is mounted between the hoist boom and the stick boom. A hydraulic circuit supplies hydraulic oil to the cylinders, and provides an oil flow path between working ends of the cylinders so as to transfer a slug of pressurized hydraulic oil between the working ends. In one embodiment, reaching movement is controlled by a pump connected to control transferring of the slug between the hoist and stick cylinders. The pump determines which cylinder receives which portion of the slug of oil, and thereby controls the angle between the booms, thereby producing reach.

20 Claims, 11 Drawing Sheets

REACH ACTUATION FOR ENERGY SAVING HYDRAULIC KNUCKLE BOOMS

REFERENCE TO RELATED APPLICATION

This application is a formal application based on and claiming the benefit of U.S. provisional patent application No. 60/410,831, filed Sep. 16, 2002.

BACKGROUND OF THE INVENTION

1. Field of the Invention

This invention relates to achieving more energy-efficient horizontal motion of a two-member knuckle boom, especially but not necessarily those which carry a tree-working tool at the distal end thereof. The term "tree-working tool" throughout this specification is intended to encompass, for example, saw heads and other devices (such as shear heads, for example), for cutting trees at the stump; tree delimbing heads; tree processing heads; wood-handling grapples for piling or loading trees or logs; and other such tools in the tree-harvesting industry. However, it is emphasized that the invention is not limited to knuckle booms used in the tree-harvesting industry.

A typical two-member knuckle boom comprises a hoist boom having a proximal end pivoted to the machine base, and a stick boom having a proximal end pivoted to the distal end of the hoist boom. In the tree-harvesting industry, a tree-working tool such as a disc saw head would be mounted on the distal end of the stick boom. Other industries of course will use other tools. A hoist cylinder is mounted between the machine base and the hoist boom, and a stick cylinder is mounted between the hoist boom and the stick boom.

2. Description of the Prior Art

The invention expands on the concepts described and claimed in Canadian patent no. 2,317,670, granted Jul. 16, 2002, and in corresponding U.S. Pat. No. 6,443,196, granted Sep. 3, 2002 (hereinafter referred to as "the prior Kurelek patents"). The prior Kurelek patents explained the concept of a hydraulic circuit for a knuckle boom which provides connecting hydraulic lines between the working ends of the hoist and stick cylinders, providing an oil flow so as to enable shunting of hydraulic oil between the working ends of the cylinders. When these cylinders are alternately extending and contracting during reaching actions with the knuckle boom, such as is always a part of tree harvesting, the circuit in that invention shunts load-supporting hydraulic oil between the cylinders rather than dumping it to tank as with previous conventional circuits. This has resulted in reduced working horsepower, i.e. fuel used and heat generation, and the ability of the operator to do reaching and tucking by operating just one lever, while continuing to do lifting and lowering with the other. This is explained in detail in the prior Kurelek patents.

In the prior Kurelek patents, there was no direct control of the shunting of hydraulic oil, for example via a valve or pump. Instead, the "reach" movement of the boom (i.e. generally horizontal extension or retraction) was controlled by an additional hydraulic cylinder, acting as a "reach" cylinder, mounted between the hoist and stick booms. In one sense, the reach cylinder in effect controlled or constrained the shunting of oil between the working ends, since the reach cylinder determined the relative positions of the hoist and stick cylinders. The reach cylinder operates one of the knuckle boom angles, usually working alongside the stick cylinder, and causes the load supporting oil to flow back and forth between the hoist and stick cylinders. The reach cylinder is required to provide the horizontal push and pull forces at the tool but normally does not do major load supporting work.

In practice, tree harvesting machines with the concepts of the prior Kurelek patents do function with benefits as described, and have already become well-accepted by users. Thus some users want to retrofit existing conventional machines to incorporate the invention, but that is difficult because the addition of a reach cylinder means that lugs for its mounting must be provided during manufacture of the machine, and on some knuckle boom structures there is insufficient physical space for a reach cylinder unless other major components are repositioned.

There is thus an ongoing need for circuits that will provide the benefits of the prior Kurelek patents without necessarily needing the major extra lugging construction and additional cylinder, and for other variations and improvements as well.

SUMMARY OF THE INVENTION

It has now been realized by the inventors, including Kurelek, that in addition to the reach cylinder used in the prior Kurelek patents, there are alternative means of controlling the shunting of oil between the working ends, to achieve the desired change of angle between the hoist and stick cylinders, and the desired reach.

Accordingly, the invention provides alternative means of producing reach, which do not involve the use of a reach cylinder as in the prior Kurelek patents.

As in the prior Kurelek patents, the invention transfers pressurized oil directly from the collapsing hoist cylinder working (pressurized, load-supporting) end to the extending cylinder working (pressurized, load-supporting) end (or vice-versa), where the oil continues to do useful load support work and thereby avoids most of the problematic heat generation. Thus the load-carrying work is separated from the reach positioning function of the knuckle boom, and is left with the hoist and stick cylinders. In the prior Kurelek patents, reaching movement was controlled by a reach cylinder. In the present invention, reaching movement is controlled by a pump connected to control transferring of the slug of pressurized hydraulic oil between the hoist and stick cylinders, or by other means as described in greater detail herein. The pump determines which cylinder receives which portion of the slug of oil, and thereby controls the angle between the booms, thereby producing reach.

The energy savings provided by this invention are very substantial, and accordingly machine size and power provided is reduced significantly, or the power saved in reaching is used in speed to gain productivity. Some embodiments of this invention will also provide even more energy savings than embodiments of the prior Kurelek patents.

Further details of the invention will be described or will become apparent in the course of the following detailed description.

BRIEF DESCRIPTION OF THE DRAWINGS

The invention will now be described with reference to the accompanying drawings of the preferred and alternative embodiments, by way of example only. In the drawings.

DETAILED DESCRIPTION

Introduction

Figure 1:
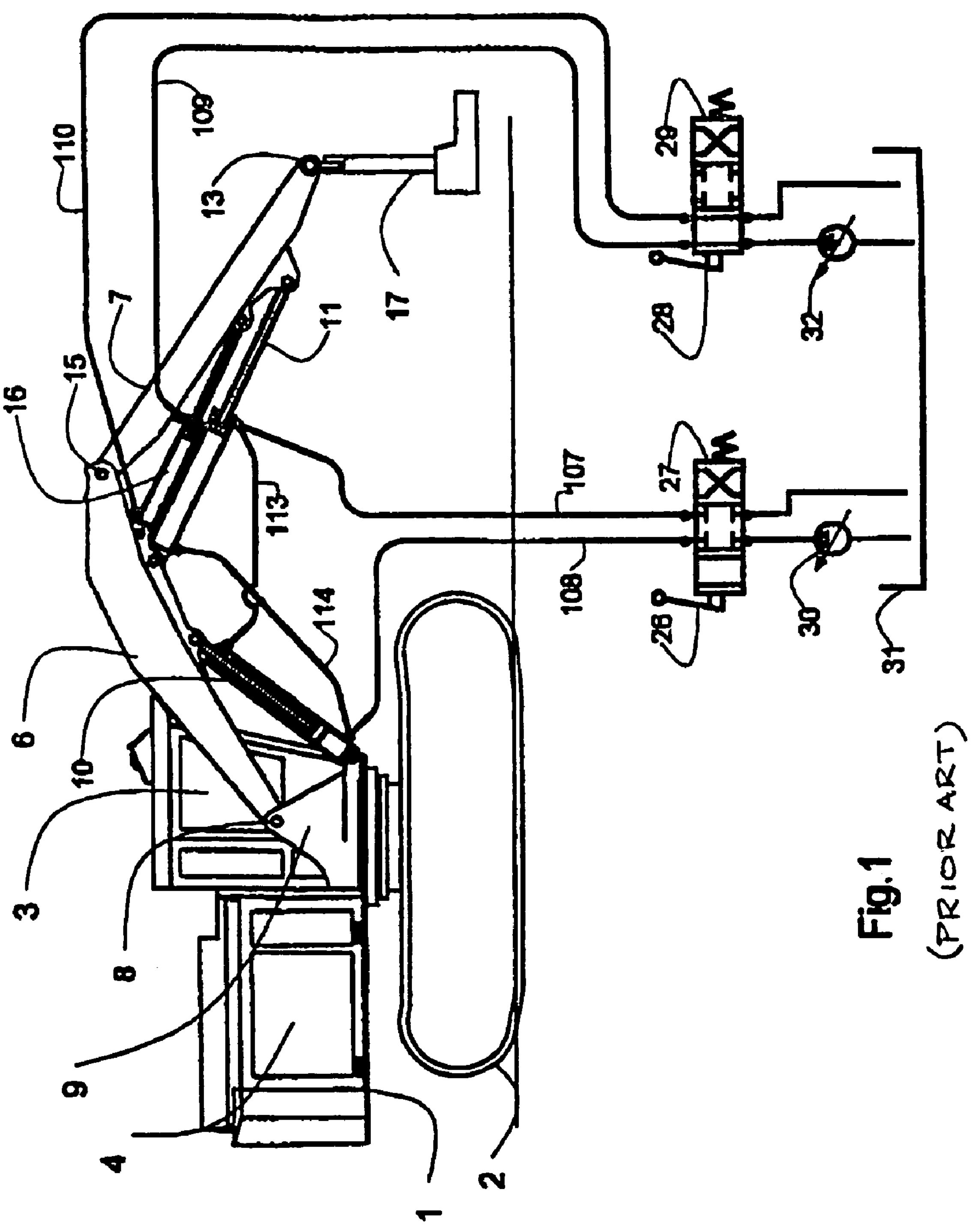
Fig.1 (PRIOR ART)
FIG. 1 (prior art) is a side elevation view showing the portions of an embodiment of the prior Kurelek patents that are pertinent to this new invention.

FIG. 1 (prior art) shows the portions of the an embodiment of the prior Kurelek patents that are pertinent to this new invention. There is a machine base 1 supported above vehicle tracks 2. An operator's cab 3 is mounted on the machine base, and a diesel engine 4 is cantilevered on the back of the machine base. The knuckle boom assembly comprises a hoist boom 6, and a stick boom 7. The hoist boom is pivotally mounted relative to the machine base at a hoist-base pivot pin 8 on a mounting bracket 9 secured to the machine base. The stick boom is pivotally connected to the distal end of the hoist boom at a hoist-stick pivot pin 15. The hoist boom is actuated by at least one hydraulic hoist cylinder 10 connected between the machine base and the hoist boom, at an effective angle relative to the hoist boom. The stick boom is actuated by at least one stick cylinder 11 connected between the hoist boom and the stick boom, at an effective angle relative to the stick boom. A reach cylinder 16 is also connected between the hoist boom and the stick boom, at an effective angle relative to the stick boom. A tool, such as a tree harvesting head 17 (not shown in detail), is carried at the distal end of the stick boom.

A simplified schematic superimposed on FIG. 1 shows how the hydraulic connections are made to reduce reach energy consumption with an embodiment of the prior Kurelek patents. The lift directional control valve 27 is controlled by the operator with lever 26, getting oil from the pump 30 and tank 31. Conduits 108 and 114 connect the base end ports of both the hoist cylinder and the stick cylinder to one of the work ports of valve 27. Conduits 107 and 113 connect the rod end ports of both the hoist cylinder and the stick cylinder to the other work port of valve 27. Conduit 114 in effect unites the base end volume of the hoist cylinder 10 with the base end volume of the stick cylinder 11. That is, the hoist cylinder and stick cylinder base ends are piped together and to a valve work port with hydraulic conduit, so that they share a common load-supporting pressurized volume or "slug" of oil behind their pistons.

A reach (directional) control valve 29 has its work ports connected by means of conduits 109 and 110 to the two ports of the reach cylinder so that the operator can stroke it with lever 28, getting oil from pump 32. As the reach cylinder is stroked, its mechanical connection with the stick cylinder lugs forces the stick cylinder to stroke as well. When thus forced to stroke the stick cylinder must exchange oil with the hoist cylinder via lines 113 and 114 and causes it to stroke and raise or lower the hoist boom. According to the prior Kurelek patents the cylinder installation geometry is such that the oil exchanged by the hoist cylinder with the stick cylinder through the conduit 114 is the correct amount to maintain the stick boom point 13 at a nearly constant height as the reach cylinder is stroked.

When the lift valve is operated alone, i.e. while leaving the reach valve not shifted, the reach cylinder will lock the stick cylinder with it, so oil flowing in line 108 can only cause the hoist cylinder to stroke and so raise or lower the tool about pivot pin 8.

Hence the prior Kurelek patents have established an art in hydraulic circuits for knuckle booms that saves energy by transferring load supporting pressurised oil between hoist and stick cylinders during reaching and at the same time gives the operator single lever reach control. The pressurized oil is caused to flow directly between cylinders by adding a reach cylinder to the knuckle boom.

Details of the Invention

Figure 2:
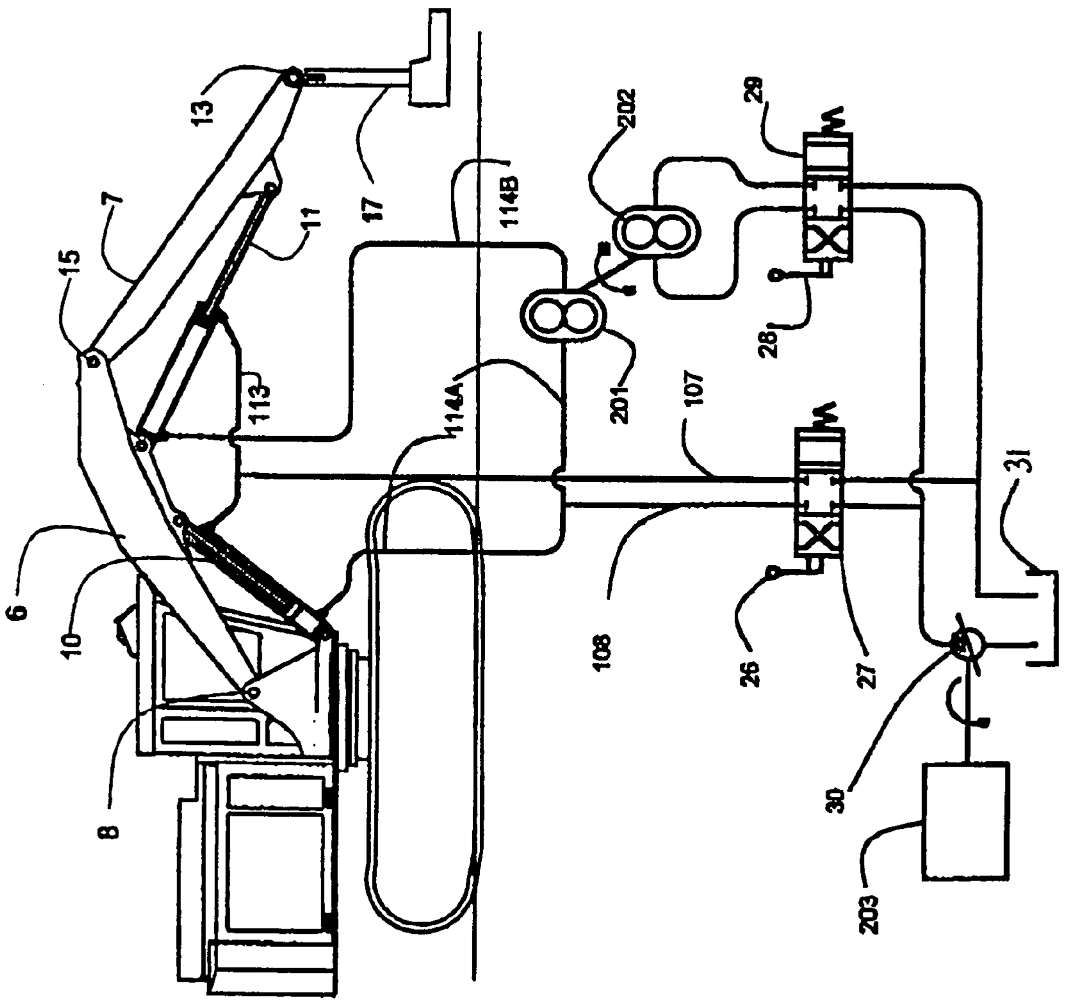
FIG. 2 is a side elevation view showing an embodiment of the present invention.

FIG. 2 illustrates the present invention which allows energy saving benefits similar to those of the prior Kurelek patents' reach cylinder circuit and construction but does not require lugging on an extra cylinder. It too provides single lever control of reaching.

The carrier may be the same as in the prior Kurelek patents and other tree harvesting machines. The knuckle boom is different from the prior Kurelek patents in that it does not have a reach cylinder. It is hence more like a conventional tree harvesting knuckle boom. As can be seen in the superimposed circuit in FIG. 2, the pump 30 driven by engine 203 continues to supply hydraulic oil to the lift and reach cylinders from tank 31, and conduit lines 107 and 113 connect one work port of the lift valve to the non-working hoist and stick cylinder ends, as in the prior Kurelek patents. However line 114 no longer joins the base end (working end) ports of the hoist and stick cylinders directly as it does in the prior Kurelek patents but instead the connection is through a hydraulic pump 201, which now does the reach actuation work that the reach cylinder does in the prior Kurelek patents.

Hydraulic motor 202 drives pump 201 when the reach control 28 is moved by the operator. In one direction the pump rotates to take oil from say the hoist cylinder and force it to flow into the stick cylinder and get the same reaching out knuckle action as was done in the prior Kurelek patents with the reach cylinder. When the operator turns the pump in the other direction the knuckle boom tucks, i.e. retracts (negative reach).

If the lift control 26 is operated and the reach control 28 is not, then the oil that is say added to the 114A conduit will not be able to reach the 114B side of the stopped (and hydraulically held) pump, so only boom lifting occurs. If the reach control and the lift control are both operated together a combination of reach and lift will happen, just as it does with a reach cylinder in the prior Kurelek patents' circuit.

If the cylinders and their geometry are done according to principles taught in the prior Kurelek patents the pressures in the two cylinders will be nearly equal and because both sides of the pump will be at working pressures not much power will be used to do reaching horizontally. Energy savings, engine and pump sizing, and productivity advantages of the prior Kurelek patents are retained and it is not necessary to install a reach cylinder on the knuckle boom.

Figure 3:
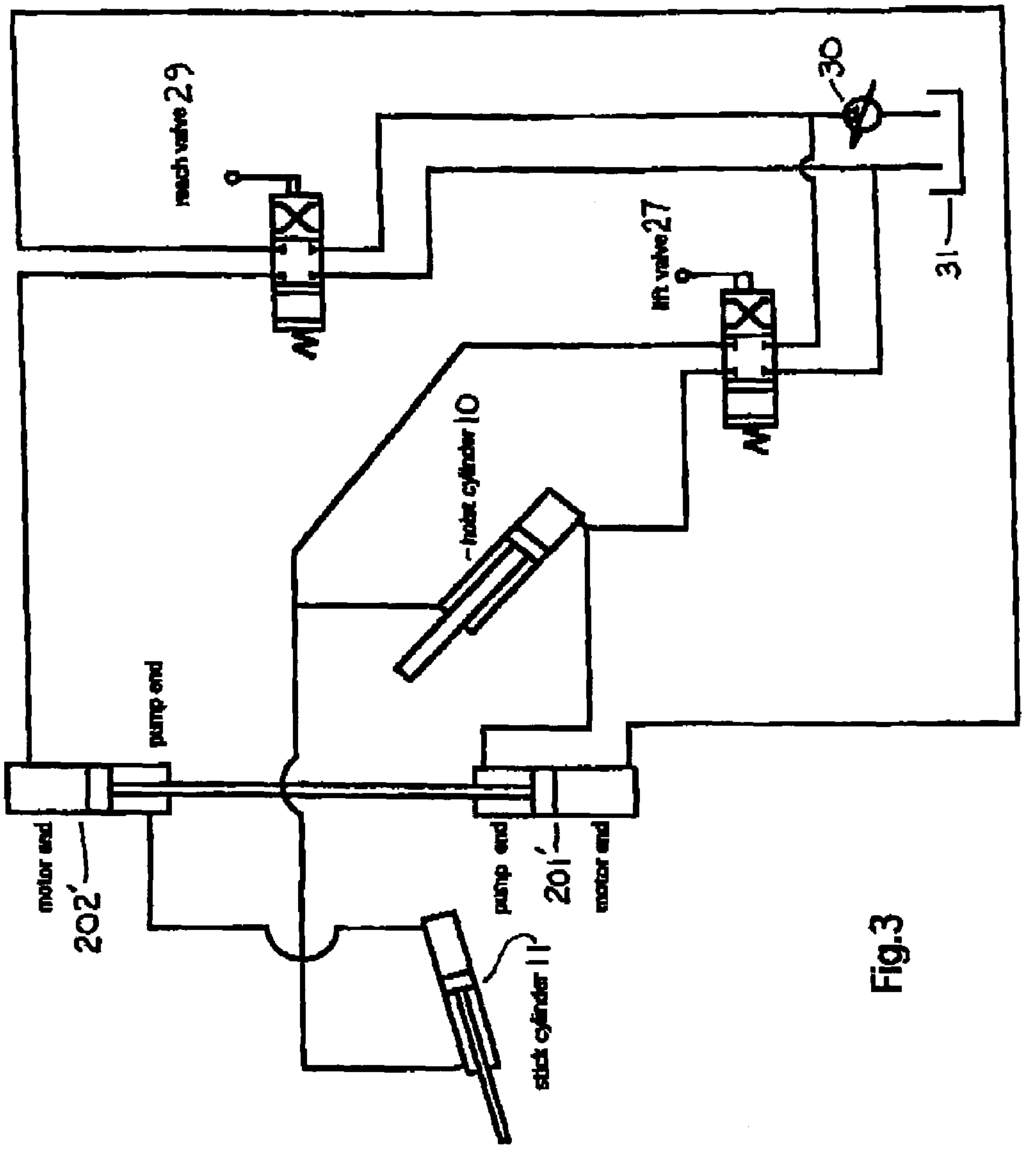
FIG. 3 is a schematic illustration showing a hydraulic circuit which uses hydraulic cylinders which would be mounted in the carrier and connected to work as a reach actuation pump.
Figure 4:
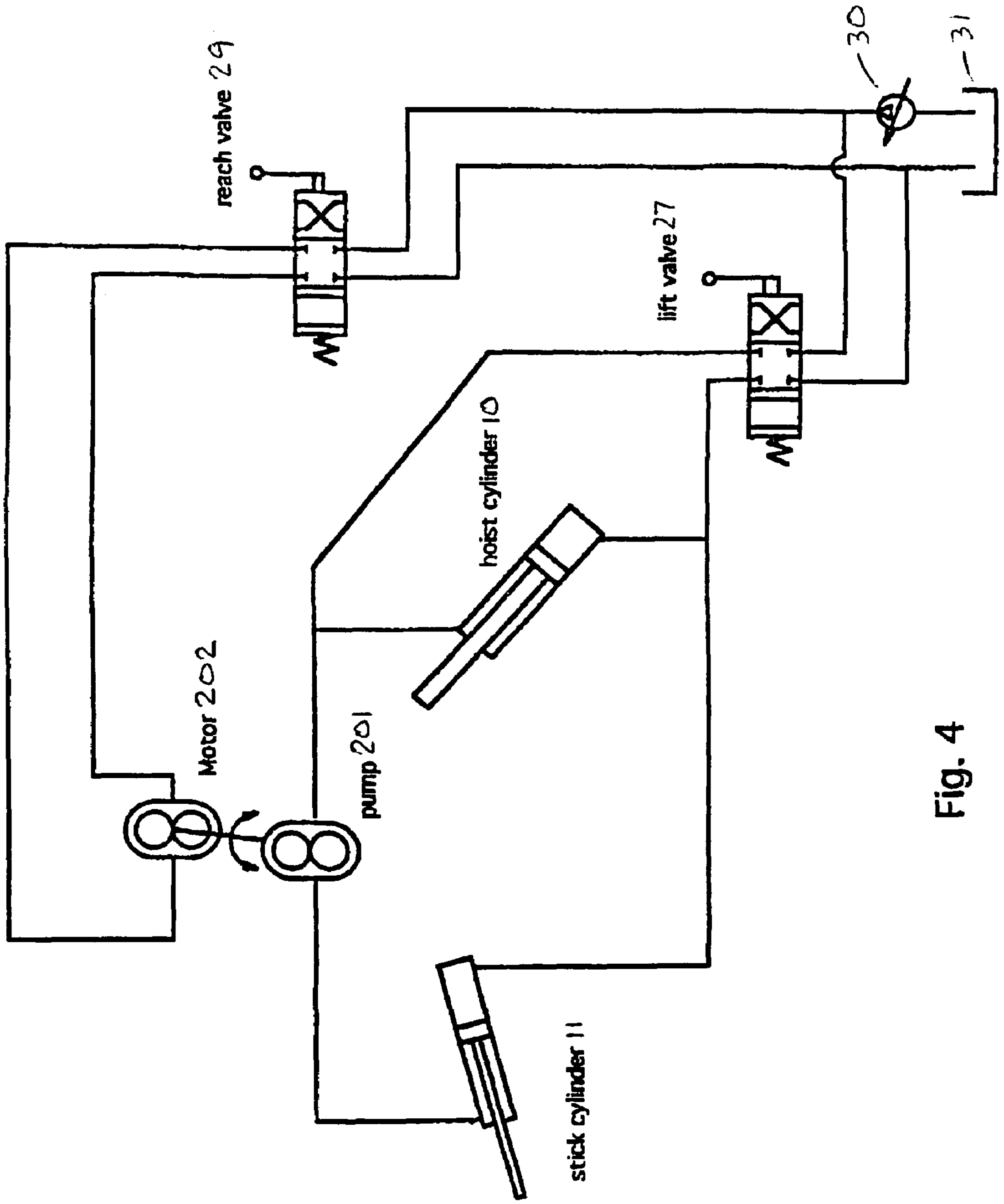
FIG. 4 is a schematic illustration showing that with slightly different connections and working conditions a pump could also be installed in the rod end conduit.

This aspect of the invention thus involves flowing pressurised oil between working cylinder ends by installing an operator controlled pumping actuator in the working end connection conduit. FIG. 2 shows the actuator as a hydraulic pump, shaft-coupled to a hydraulic motor that is operator controlled with a directional control valve similar to the reach cylinder valve of the prior Kurelek patents. (In the prior Kurelek patents there is no reach actuator in the working end connecting conduit.) However, the invention is not limited to rotating pumps. FIG. 3 shows a hydraulic circuit which uses hydraulic cylinders mounted in the carrier and connected to work in effect as a reach actuation pump. These are indicated as a motor cylinder 202' and a pump cylinder 201'. FIG. 4 shows that with slightly different connections and working conditions a pump could also be installed in the rod end conduit. This circuit subjects the pump components to less hydraulic pressure than when installed in the base end.

Further Embodiments

Figure 5:
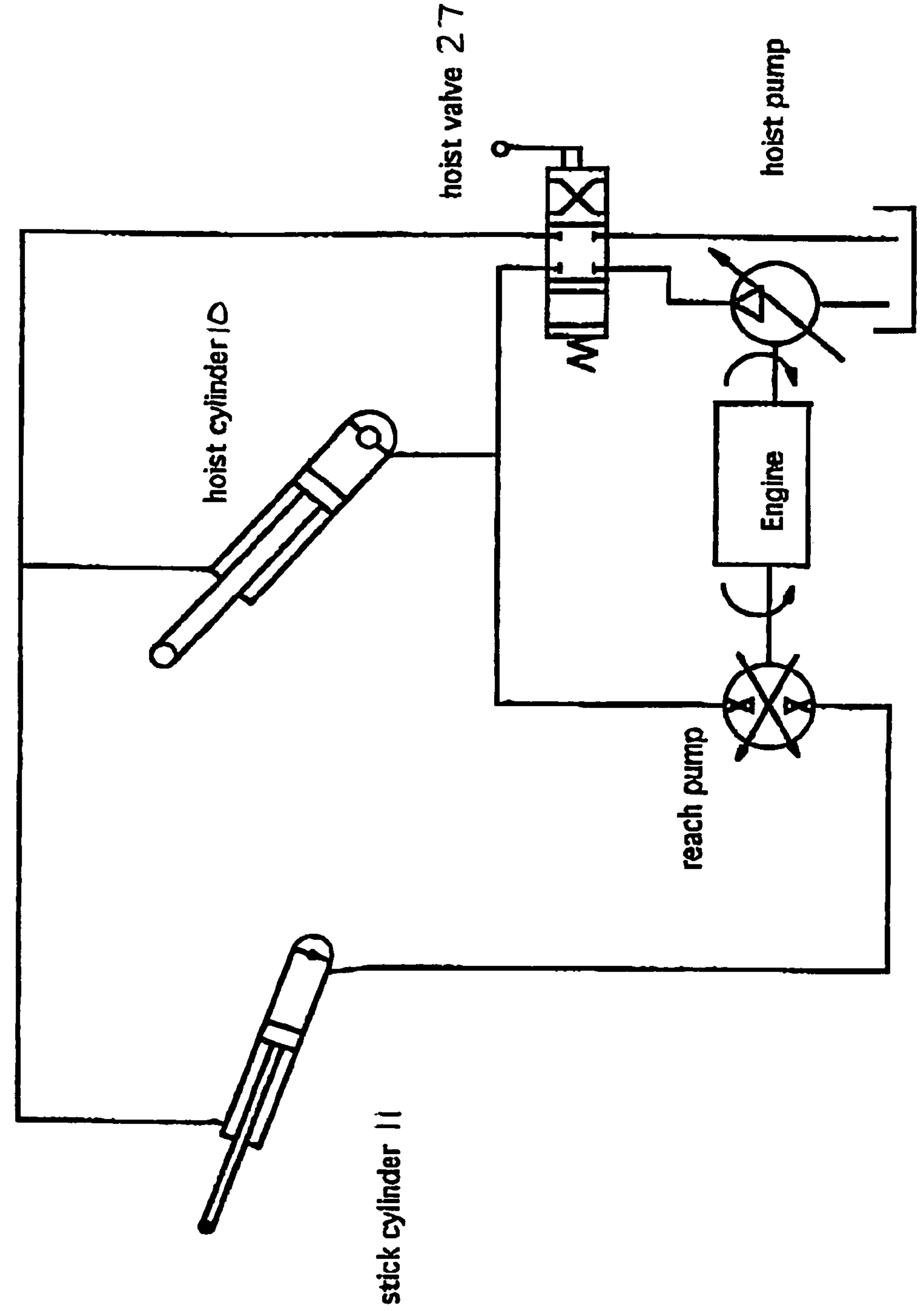
FIG. 5 is a schematic illustration showing a circuit that uses a closed loop variable displacement pump for reach actuation instead of hooking on to the conventional pump with a directional control valve.

The use of a pump-type reach actuator different from the reach cylinder of the prior Kurelek patents allows further control and energy saving advantages. FIG. 5 shows a circuit that uses a closed loop variable displacement pump for reach actuation instead of hooking on to the conventional pump with a directional control valve. With this circuit when the operator wants to reach he moves the reach pump swash plate to pump oil in the wanted direction from one cylinder base to the other. If one cylinder happens to be loaded heavier than the other and he wants the oil to flow from the higher pressure cylinder to the lower one the closed loop pump will actually lower the pressure by being turned like a motor and transmit shaft torque back into the engine where it usually can be used to do some other work. This is scientifically better than the controlling of a reach cylinder as in FIG. 1 or a hydraulic motor as in FIG. 2 where any extra pressure energy in the oil is lost as heat at the spool of the directional control valve.

Figure 6:
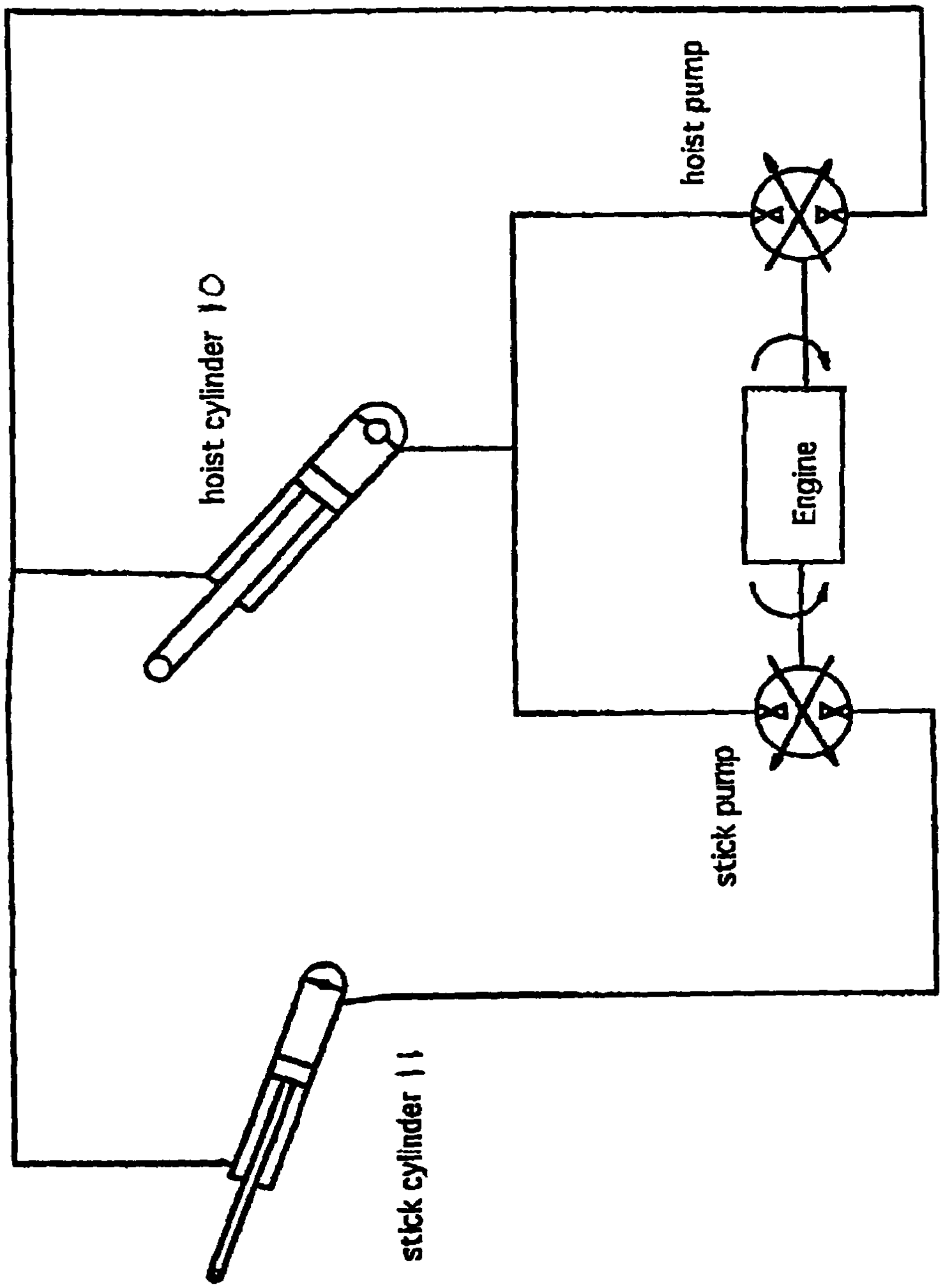
FIG. 6 is a schematic illustration showing that the hoist pump can also be a closed loop type so that the energy stored during boom lifting is recovered to the engine when the boom is lowered.

FIG. 6 shows that the hoist pump can also be a closed loop type so that the energy stored during boom lifting is recovered to the engine when the boom is lowered. Use of this type of hook-up for hoisting in combination with a reach pump is novel and inventive. The smoothness of swash plate type controls can be useful to take advantage of the higher speeds available when energy is saved with efficient reach circuits.

Additional Features

Figure 7:
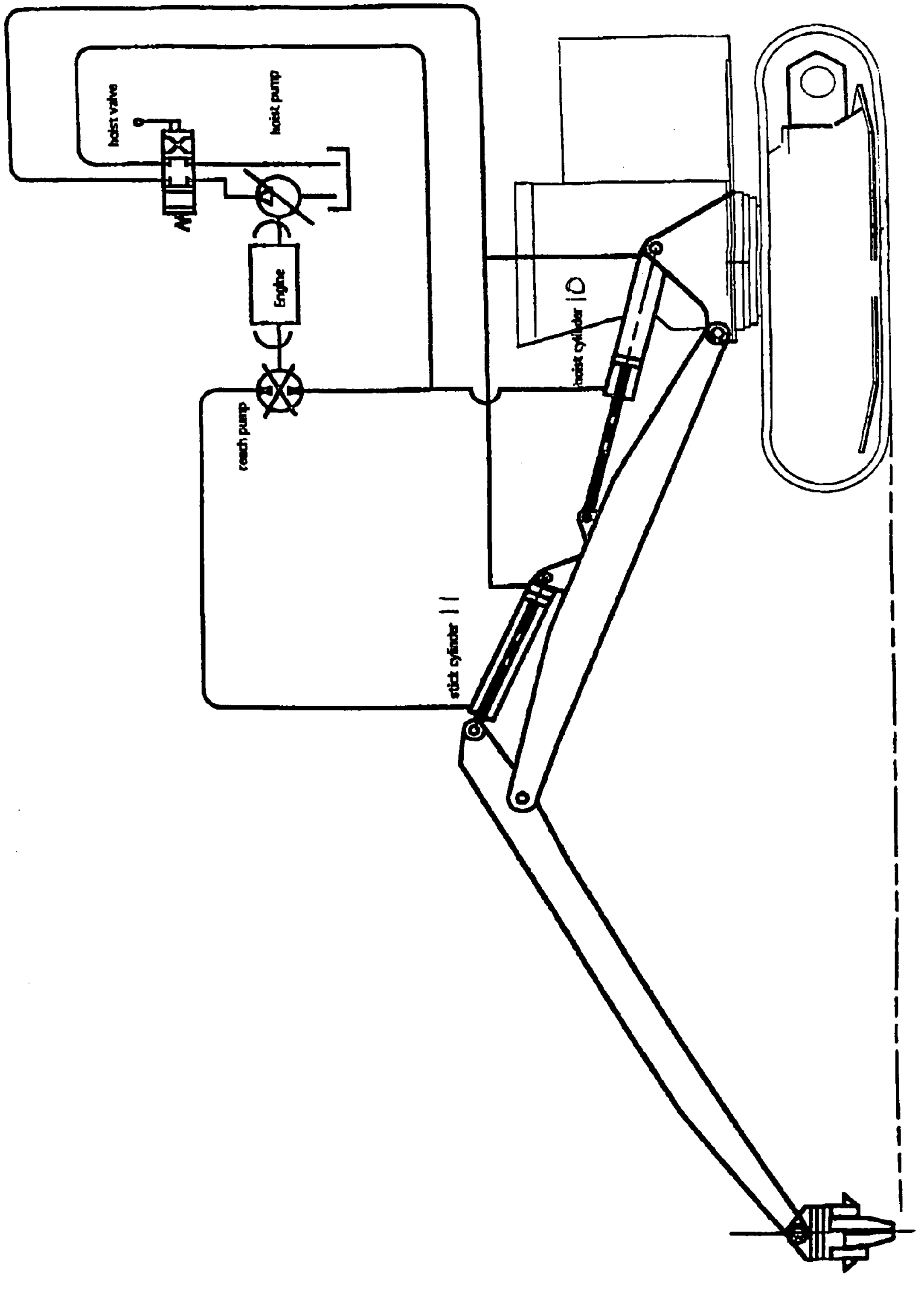
FIG. 7 is a side elevation view showing that the rod ends of the cylinders could be used instead of the base ends.

FIG. 7 illustrates that although the preceding assumes the base ends of the hoist and stick cylinders to be the working ends, it is sometimes desirable to use the rod ends under pressure. FIG. 7 thus shows use of the rod ends of the cylinders. A typical knuckle boom hydraulic cylinder necessarily has a rod end effective piston area that is only one half of its base piston area. Hence for cylinder economy size and weight and oil flow needs nearly all hydraulic boom configurations are selected with the base areas being the working ends, i.e. doing the work of supporting the boom weight and the load. Sometimes however for particular work it is desirable to have the higher cylinder force pushing/working in a particular direction on the knuckle boom. FIG. 7 thus shows that the benefit of the invention can be achieved by connecting the working ends of the hoist and stick cylinders through a pump as in FIG. 2 or FIG. 5, even though using the rod ends of the cylinders instead. In the prior Kurelek patents, if efficient reach was wanted on this type of hoist and stick cylinder layout, the reach cylinder would be located alongside the stick cylinder.

A further variation is the possibility of a "float" capability. This means a control position where the boom is supported, but relatively free to float in terms of reach (generally horizontal extension or retraction).

There are applications of the invention, on tree working machines for example, where it is important not to hit or push the tree too hard as it is approached with a tool while the carrier is being driven. Hitting too hard could damage the bark and continued pushing could uproot the tree, but always approaching very gingerly would decrease productivity.

Figure 8:
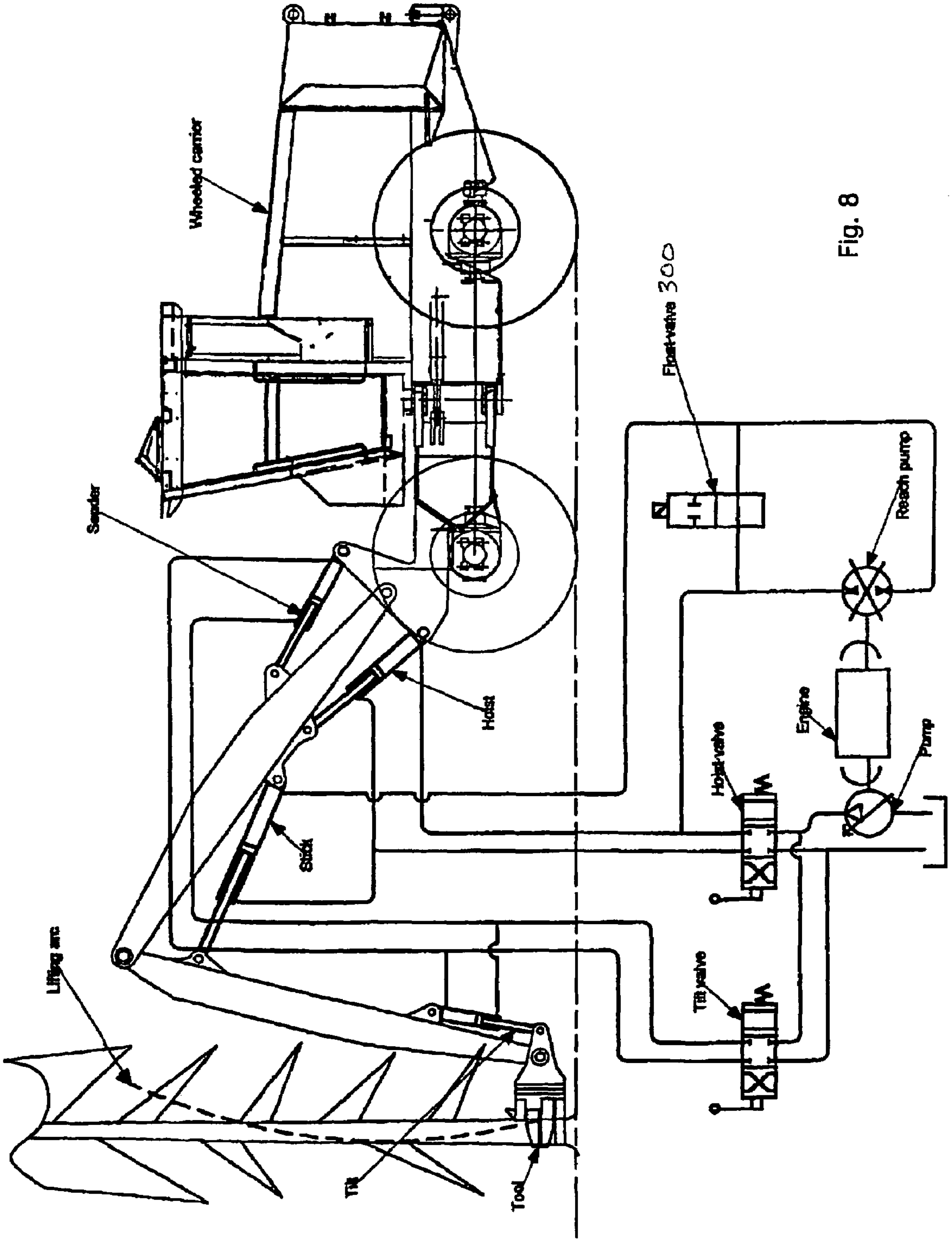
FIG. 8 shows a float valve added to a circuit for a wheeled felling or tree working machine that also keeps the tool vertical during reaching, with a tilt cylinder below the stick boom.
Figure 9:
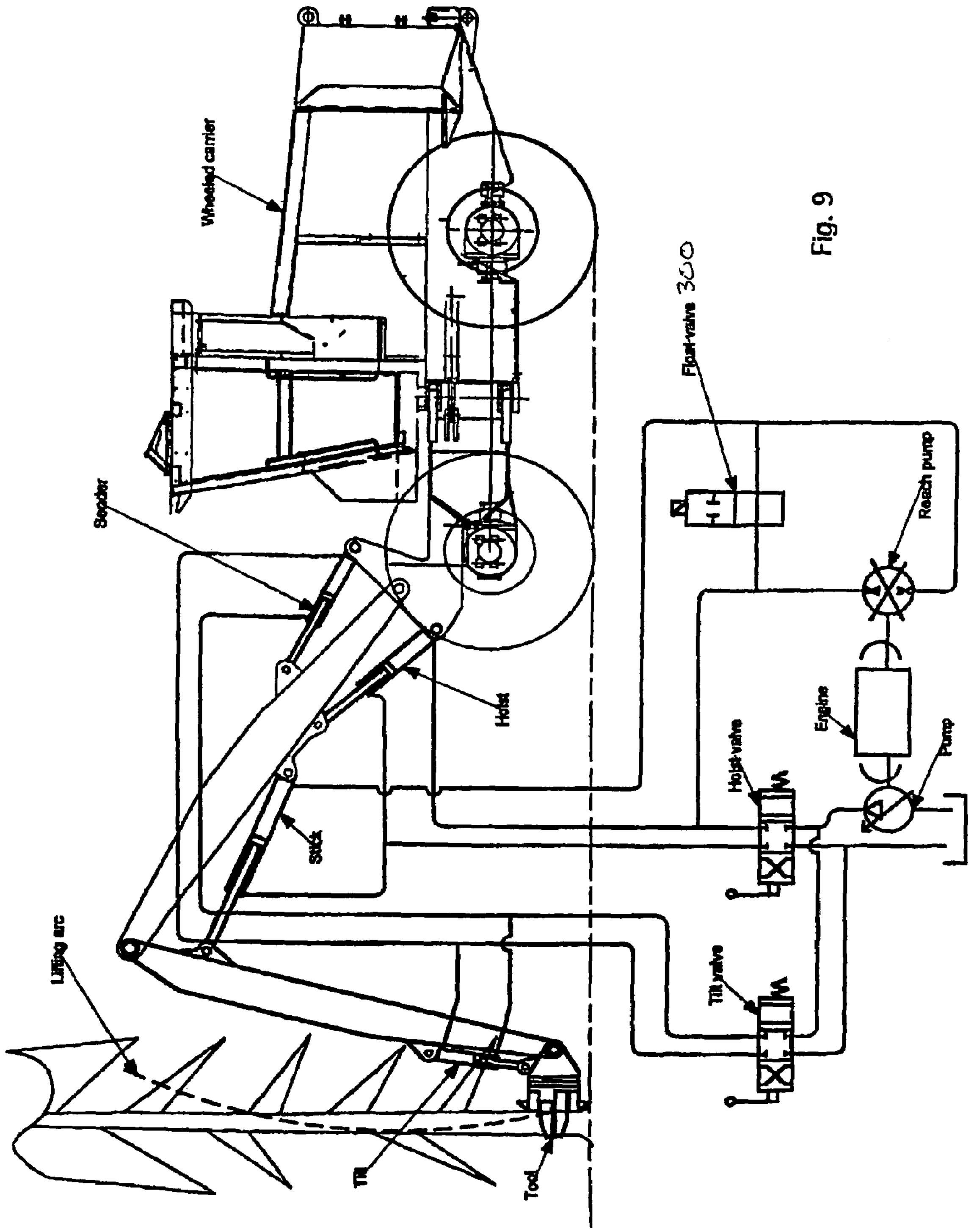
FIG. 9 shows a float valve added to a circuit for a wheeled felling or tree working machine that also keeps the tool vertical during lifting, with the tilt cylinder above the stick boom.

In addition, it is sometimes desirable to raise the head with its arms lightly embracing the tree, so that limbs are cut or scrubbed off. FIGS. 8 and 9 illustrate that there would be sufficient arcing of the head about the hoist-boom to base-pivot pin to sometimes strain the tree, particularly near the stump where the tree is stout, unless the operator also adjusted the reach as he did the lifting.

Adding a float position to the reach positioning actuator improves the situations described in the two preceding paragraphs, whether with a reach cylinder embodiment or with a pump embodiment. In the invention, it is particularly easy to have the head virtually slidable in and out by simply ceasing to restrain the reach actuator and allowing oil to flow between the already connected hoist and stick cylinders. The invention is ideal for enabling the tool to be pushed outwardly or pulled inwardly with a relatively small external force when the tool is lifted clear of the ground. The operator would choose to go into "float" mode by pushing a momentary button when the job demanded it.

In addition to showing a float valve 300, FIG. 8 shows an automatic sender and tilt hydraulic circuit, as in the prior Kurelek patents, for the head to be kept generally vertical as reaching is done. Thus while reaching is being done to get the head to and on the tree, the operator does not need to be much concerned about the vertical attitude of the head. Once within arms' reach, the operator would put the knuckle in float and close the arms, with the head being able to snuggle up to the tree in reach float rather than the entire carrier having to readjust its position or the tree's roots being strained.

Furthermore, if the head is then lifted while the knuckle is in float the head will have a chance to follow the direction of the tree rather than being forced to arc about the hoist-boom to base-pivot pin.

If the head is to be stroked up the standing tree to remove limbs, its tilt cylinder will have to be continuously adjusted so that the head axis remains parallel to the tree. Accordingly, the tilt cylinder should be moved from beneath the stick boom to above it as in FIG. 9 and set up to hold the head near vertical when it is lifted.

Figure 10:
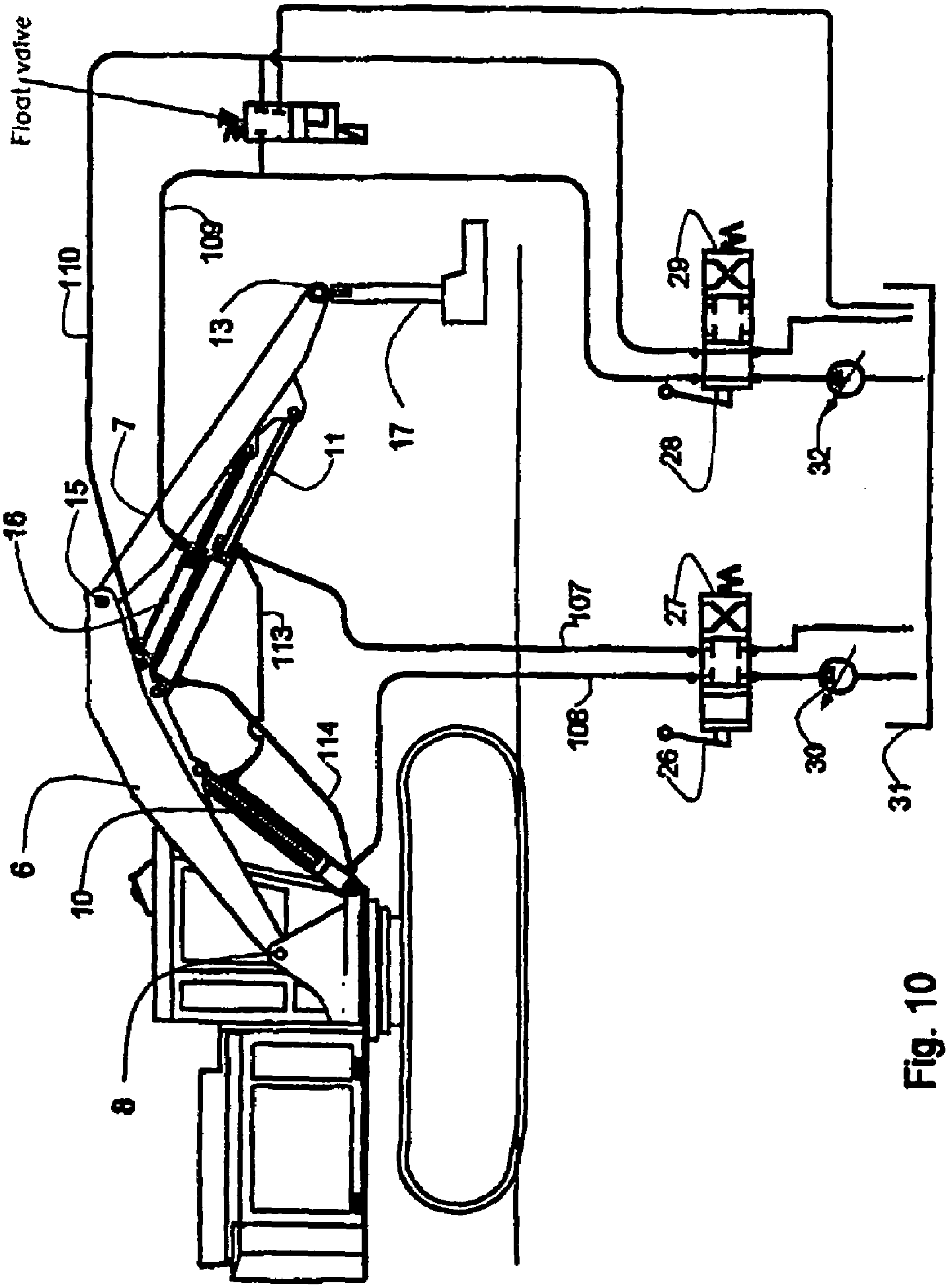
FIG. 10 shows that a float valve can also be fitted to a circuit with a reach cylinder.

FIGS. 8 and 9 show a hydraulic circuit which would be used if reach control was being done by means of the closed loop engine driven pump. Float could also be done if a reach cylinder was used, by dumping across the cylinder and to tank with a similar solenoid controlled valve, as in FIG. 10.

Figure 11:
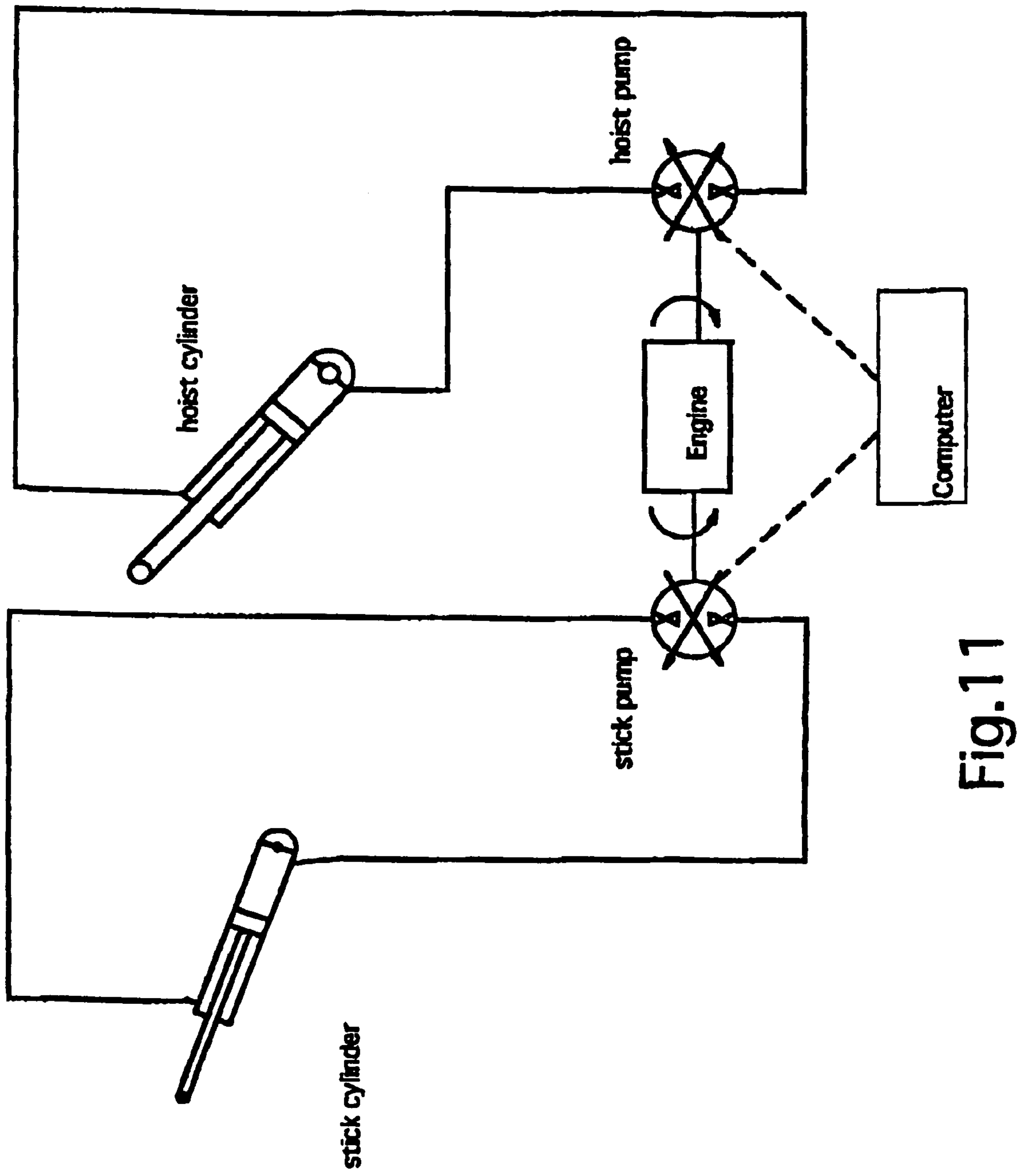
FIG. 11 is a schematic illustration showing that the concept of taking energy from a collapsing cylinder and using it to raise an extending cylinder as during reaching can be employed by computer programming two closed loop pumps to pump or remove oil at the right time.

FIG. 11 shows that the concept of taking energy from a collapsing cylinder and using it to raise an extending cylinder as during reaching can be employed by computer programming two closed loop pumps to pump or remove oil at the right time. In this case there is no connecting hydraulic conduit, but instead an analogous capture of mechanical energy by the engine from one pump and use of it in another.

What is claimed is:

1. A knuckle boom apparatus, comprising:

a machine base:

a hoist boom having a proximal end pivoted to the machine base, and a distal end remote therefrom;

a stick boom having a proximal end pivoted to the distal end of the hoist boom;

at least one hydraulic hoist cylinder mounted between said machine base and said hoist boom;

at least one hydraulic stick cylinder mounted between said hoist boom and said stick boom;

a hydraulic circuit for operatively supplying hydraulic oil to said cylinders, wherein said hydraulic circuit comprises an oil flow path between working ends of said hoist and stick cylinders so as to transfer hydraulic oil between said working ends; and means for producing reach, comprising pump means connected to control said transfer of hydraulic oil between said working ends.

2. A knuckle boom apparatus as in claim 1, wherein said pump means comprises a reversible flow pump connected between said working ends.

3. A knuckle boom apparatus as in claim 1, wherein said pump means comprises an engine-driven variable displacement reversible flow pump connected between said working ends.

4. A knuckle boom apparatus as in claim 1, further comprising an engine-driven variable displacement reversible flow pump connected to operate said hoist cylinder and so as to be capable of recovering shaft torque energy from pressurized oil removed by said pump from the hoist cylinder.

5. A knuckle boom apparatus as in claim 2, further comprising an engine-driven variable displacement reversible flow pump connected to operate said hoist cylinder and so as to be capable of recovering shaft torque energy from pressurized oil removed by said pump from the hoist cylinder.

6. A knuckle boom apparatus as in claim 3, further comprising an engine-driven variable displacement reversible flow pump connected to operate said hoist cylinder and so as to be capable of recovering shaft torque energy from pressurized oil removed by said pump from the hoist cylinder.

7. A knuckle boom apparatus as in claim 1, wherein said working ends of said cylinders are their respective base ends.

8. A knuckle boom apparatus as in claim 1, wherein said working ends of said cylinders are their respective base ends.

9. A knuckle boom apparatus as in claim 3, wherein said working ends of said cylinders are their respective base ends.

10. A knuckle boom apparatus as in claim 1, wherein said working ends of said cylinders are their respective rod ends.

11. A knuckle boom apparatus as in claim 2, wherein said working ends of said cylinders are their respective rod ends.

12. A knuckle boom apparatus as in claim 3, wherein said working ends of said cylinders are their respective rod ends.

13. A knuckle boom apparatus as in claim 1, wherein said hydraulic circuit includes a valve which allows said pump to be bypassed, so that hydraulic fluid is then free to flow between the respective working ends of the cylinders, instead of that flow being controlled by operation of said pump.

14. A knuckle boom apparatus as in claim 2, wherein said hydraulic circuit includes a valve which allows said pump to be bypassed, so that hydraulic fluid is then free to flow between the respective working ends of the cylinders, instead of that flow being controlled by operation of said pump.

15. A knuckle boom apparatus as in claim 5, wherein said hydraulic circuit includes a valve which allows said pump to be bypassed, so that hydraulic fluid is then free to flow between the respective working ends of the cylinders, instead of that flow being controlled by operation of said pump.

16. A knuckle boom apparatus, comprising:

a machine base;

a hoist boom having a proximal end pivoted to the machine base, and a distal end remote therefrom;

a stick boom having a proximal end pivoted to the distal end of the hoist boom;

at least one hydraulic hoist cylinder mounted between said machine base and said hoist boom;

at least one hydraulic stick cylinder mounted between said hoist boom and said stick boom; and a hydraulic circuit for operatively supplying hydraulic oil to said cylinders, said circuit using two engine-driven computer-controlled reversible flow pumps connected to supply or remove oil in coordinated fashion from working ends of said cylinders, to capture mechanical enemy by the engine from one said pump and use it in the other said pump.

17. A knuckle boom apparatus, comprising:

a machine base;

a hoist boom having a proximal end pivoted to the machine base, and a distal end remote therefrom;

a stick boom having a proximal end pivoted to the distal end of the hoist boom;

at least one hydraulic hoist cylinder mounted between said machine base and said hoist boom;

at least one hydraulic stick cylinder mounted between said hoist boom and said stick boom;

a hydraulic circuit for operatively supplying hydraulic oil to said cylinders, wherein said hydraulic circuit comprises an oil flow path between non-working ends of said hoist and stick cylinders so as to transfer hydraulic oil between said non-working ends; and means for producing reach, comprising pump means connected to control said transfer of hydraulic oil between said non-working ends.

18. A knuckle boom apparatus as in claim 17, wherein said pump means comprises a reversible flow pump connected between said non-working ends.

19. A knuckle boom apparatus as in claim 17, wherein said pump means comprises an engine-driven variable displacement reversible flow pump connected between said non-working ends.

20. A knuckle boom apparatus as in claim 17, further comprising an engine-driven variable displacement reversible flow pump connected to operate said hoist cylinder and so as to be capable of recovering shaft torque energy from pressurized oil removed by said pump from the hoist cylinder.

* * * * *